Nov. 28, 1933.  L. A. MACKLANBURG  1,936,987

WEATHER STRIPPING

Filed March 17, 1932   2 Sheets-Sheet 1

Inventor
Louis A. Macklanburg
By Mason Fenwick Lawrence
Attorneys

Nov. 28, 1933.  L. A. MACKLANBURG  1,936,987
WEATHER STRIPPING
Filed March 17, 1932  2 Sheets-Sheet 2

Inventor
Louis A. Macklanburg
By Mason Fenwick & Lawrence
Attorneys

Patented Nov. 28, 1933

1,936,987

UNITED STATES PATENT OFFICE 1,936,987

WEATHER STRIPPING

Louis A. Macklanburg, Oklahoma City, Okla.

Application March 17, 1932. Serial No. 599,573

7 Claims. (Cl. 20—69)

This invention relates to improvements in weather stripping; and, more particularly, to a weather strip which will always make a close tight fit to exclude cold air, dust, dirt or the like, even though there is extreme warp present.

Heretofore, metallic weather stripping has usually consisted of a substantially flat piece of metal having one edge secured and the other edge free, the window or door when closed contacting with the free edge by way of a "wiping" action. Such window strip is extremely unsatisfactory where there is a considerable amount of warping, particularly in casement windows. In such windows, a securing means is usually mounted in the middle, with the result that the window is drawn tightly in at the point opposite the securing means, but a loose fit results at the outer ends. This may result from the window warping, or the fact that the securing means is located at the center.

It is obvious that where the usual flat window stripping is used, there will not be sufficient resiliency present to take care of the variance between the outer ends and the middle. This same problem is present in connection with doors which have the securing means intermediate the ends. It is, therefore, necessary that a weather stripping be provided which is of extreme resiliency in character, so that a contacting sealing surface is presented along the entire striking edge.

The object of my invention is to provide a weather stripping that is extremely resilient in character and which is so mounted in relation to the closure member that instead of a "wiping" action the weather strip will be compressed by a direct striking force. In order to obtain this result, the weather strip must present a broad striking face preferably of oval or round contour with a series of resilient bends in direct line with the line of force and the secured end of the strip.

Other objects of the invention will be disclosed in the specification and drawings forming a part of this application.

Figure 1:
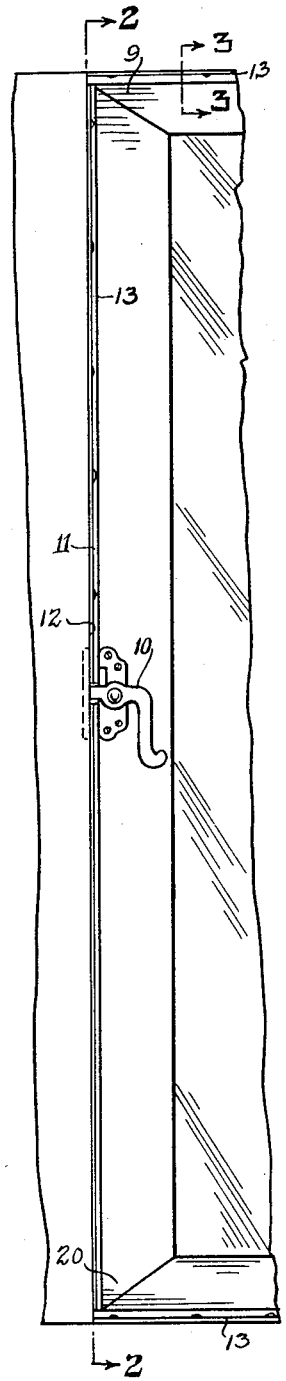
Figure 1 is a fragmentary front elevation illustrating the invention on a casement window.
Figure 2:
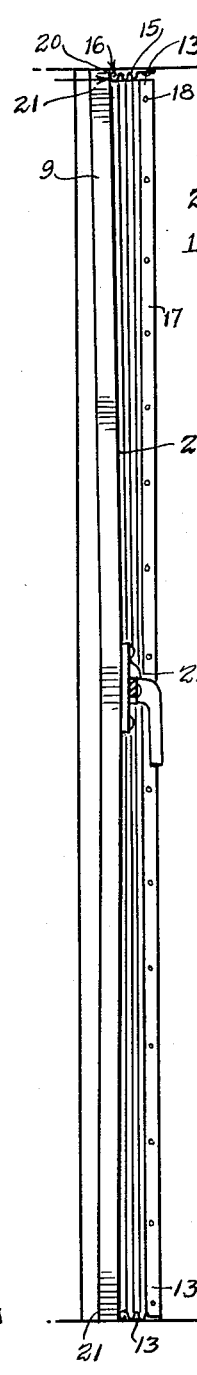
Figure 2 is a vertical section taken on line 2—2 of Figure 1, illustrating the extreme resiliency of the strip required.
Figure 3:
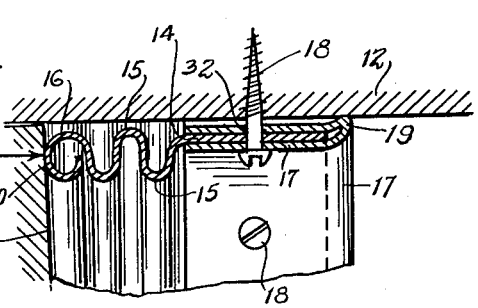
Figure 3 is a vertical section taken on line 3—3 of Figure 1.

Referring to the drawings in which like reference characters indicate like or corresponding parts, numeral 9 designates a casement window having a fastener 10 positioned in the middle of the window 9 adjacent the outer edge 11. A muntin or meeting strip 12 carries the weather strip 13, as illustrated in Figures 2 and 3. The weather stripping 13 has an edge 14 adapted to be secured and having a series of rounded curves 15 with a curved striking head 16, the head 16 and curves 15 in line with the securing edge, the weather strip 13 mounted at right angles to the window 9. A sheath 17 is adapted to receive the securing edge 14 and reinforce the same, since the strip 13 is of very thin metal.

Screws 18 extend through the sheath 17 and the securing edge 14. A downturned portion 19 of the sheath 17 forms a sealing edge with the muntin 12, it being forced into close contact with the muntin 12 by the screws 18. By having the downturned edge 19, the sheath 17, and in turn the weather stripping 13, are slightly spaced from the muntin 12 lending resiliency to the free end 20 of the weather strip 13.

As shown in Figure 2, the window 9 is warped at the outer ends 21, but is drawn tightly in at 22 adjacent the securing means 10. Due to the fact that the face 22' of the window 9 strikes the head 16, there will be a sealing contact the entire length of the window, but less pressure will be exerted at the ends 21 than at the point 22. Similarly, the strip 13 will be compressed more at the center than at the outer ends.

Figure 4:
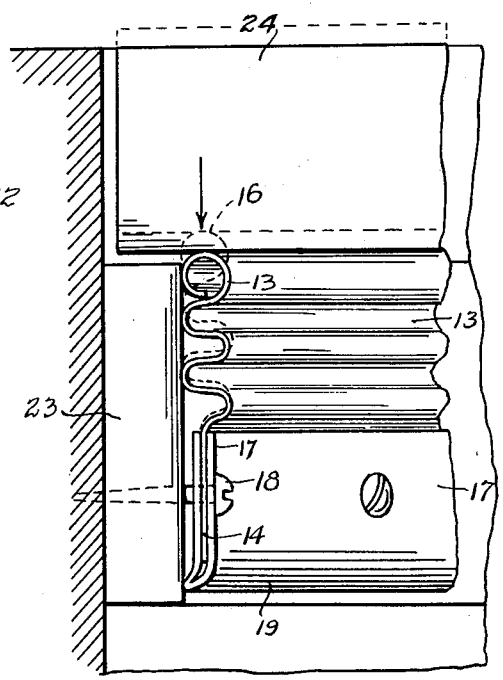
Figure 4 is a perspective showing the strip attached to a door stop in relation to a door.

As shown in Figure 4, the strip 13 is secured to a door stop 23, the strip 13 being shown in compressed position in contact with a door 24, the normal position of the strip 13 being shown in dotted lines.

Figure 5:
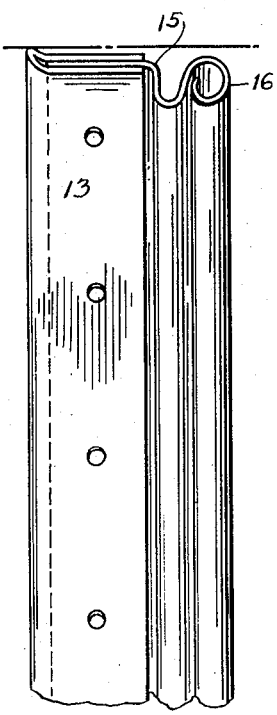
Figure 5 is a detail perspective of one form of the weather stripping.

Figure 5 shows a single curve 15 in the form of a fluting, the curve extending below the horizontal plane of the securing edge 14 and continuing up to form the rounded head 16, the highest portion of which is in the horizontal plane of the securing edge 14.

Figure 6:
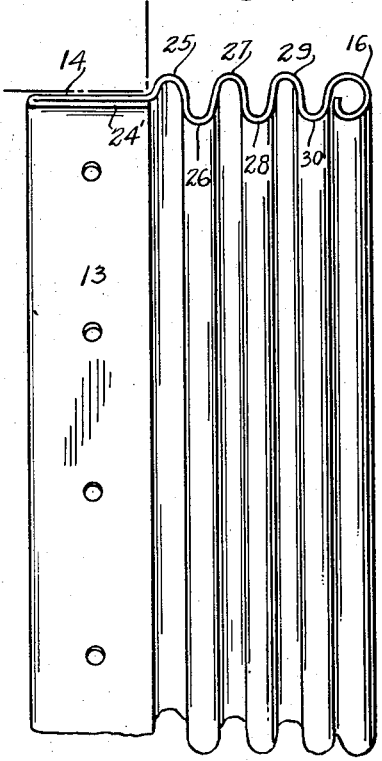
Figure 6 is a detail perspective of still another modified form.

Figure 6 shows a modified form of the strip wherein the securing edge 14 is folded upon itself to form a reinforcing strip 24', the first curve 25 extending above the horizontal plane of the securing strip 14, the second curve 26 extending below, the third curve 27 extending above, the fourth curve 28 extending below, the fifth curve 29 extending above, and the sixth curve 30 extending below with the head 16 bisecting the horizontal plane. By having the curves 25, 26, 27, 28, 29, and 30 and the head 16 extending above and below the horizontal plane of the securing strip 14, a more evenly distributed spring effect is obtained which can be readily absorbed by the securing strip 14.

Figure 7:
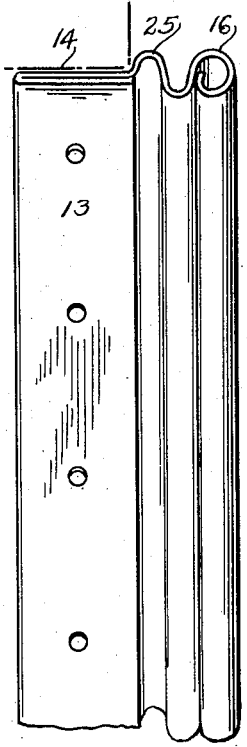
Figure 7 is a perspective of another modified form.

The modified form shown in Figure 7 is similar to Figure 6, except that only two bends 25 and 26 are used.

Figure 8:
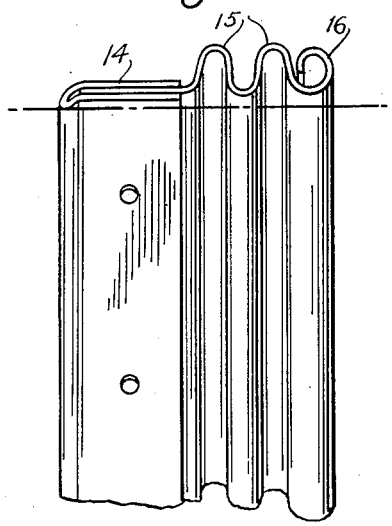
Figure 8 is a perspective of a modified form.

Modified Figure 8 is similar to Figure 5, except that three curves 25, 26 and 27 are included, each of which are above the horizontal plane of the strip 14.

Figure 9:
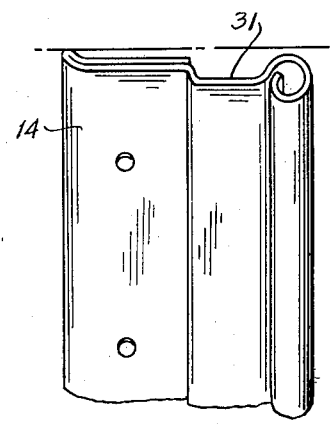
Figure 9 is a perspective of still another modified form.

Figure 9 is a modified form adapted to fit over an edge, the curve 31 being elongated over the curve shown in the other modified forms.

As actually used, the weather stripping 13 will be secured to the muntin or meeting strip 12 in a casement window or the door stop 23 in the case of a door, the strip being secured at right angles to the striking portion of the door so that the head 16 will contact the whole free edge being compressed in accordance with the force exerted against the head 16. By making the curves rounded, the danger of breaking the strip when flexed, is largely obviated. The strip 13 is secured away from the edge of the supporting member so as to permit ample flexing of the free edge 20 of the strip 13. The securing edge 14 may be either doubled upon itself to form a reinforcing strip, or may be placed within a sheath 17 to provide additional strength as a base plate. Openings 32 are formed in the sheath 17 to coincide with the openings formed in the securing strip 14.

It is obvious that my invention may take different forms so long as the free edge provides a resilient portion that responds to a force delivered in a plane parallel to the plane of the securing member, the portion between the outer contacting surface and the securing edge being resilient and adapted to absorb the force.

It is to be noted that by arranging the free edge in the manner described, the free edge may move in more than one direction, so as to more completely contact a striking surface. In other words, it may move inwardly and laterally at the same time.

It is to be noted that the purpose of all weather strips is to seal the opening between the sash or door and the frame which it engages. In the majority of types of resilient weather strip, the resilient or spring portion of the strip is placed and confined entirely in and to the space which is to be closed by the weather strip, which space in some instances is so small that the application and flexing of the resilient or spring strip is not permissible. In this invention, the weather strip is placed on the door or window in such a manner that the resilient portion of the strip is not confined entirely to the space to be closed by the weather strip but said resilient or flexing portion is distributed by a series of curves over a much greater area than the actual space to be closed.

It is to be noted that the construction of this type of weather strip will enable it to be used on all types of metal or wood windows or doors either of the swinging or sliding type and this construction allows the weather strip to be attached on either the frame or the sash itself, whichever is preferable.

What I claim is:

1. A metallic weather strip comprising a portion adapted to be secured and having a substantially tubular free edge, a substantially resilient portion between said tubular portion and said portion adapted to be secured, said tubular portion being in the same plane with said portion adapted to be secured.

2. A weather strip comprising a portion adapted to be secured, a substantially tubular free edge, a resilient fluting between said portion adapted to be secured and said tubular portion, said fluting and said tubular portion being substantially in the same plane with said portion adapted to be secured.

3. A weather strip comprising a portion adapted to be secured, being bent upon itself to form a reinforcing strip and having a free edge, the outer extremity of which being rounded to form a buffer, a resilient portion between said rounded portion and said portion adapted to be secured, said rounded portion being in the same plane with said portion adapted to be secured.

4. A metallic weather strip comprising a portion adapted to be secured, having a portion bent upon itself to form a reinforcing strip and having a free edge rounded at its outer extremity, a resilient fluted portion between said rounded portion and said portion adapted to be secured, parts of said fluted portion and said rounded portion extending above and below the plane of said portion adapted to be secured.

5. A metallic weather strip, a base, a portion of said strip secured to said base and having a free edge extending in substantially the same plane with said secured portion and having its outer extremity rounded, said secured portion having a downturned toe adapted to space said secured portion away from said base to give added resiliency to said free portion, a resilient fluted portion between said secured edge and said rounded portion, said rounded portion adapted to form a securing contact with a striking surface positioned at right angles to said strip.

6. A weather strip comprising a longitudinally extending part adapted to be secured and having a free edge part formed to constitute a contact face, a substantially resilient portion between the contact face and the part to be secured, said contact part, securing part and resilient part being in substantially a common plane and said resilient part formed to permit compression in that plane.

7. A weather strip comprising a longitudinally extending part adapted to be secured and having a free edge part formed to constitute a contact face, a resilient, longitudinally fluted portion intermediate said securing part and contact face, said parts being in substantially a common plane but the sides of the flutes extending beyond said plane on each side thereof.

LOUIS A. MACKLANBURG.